Figure 1:
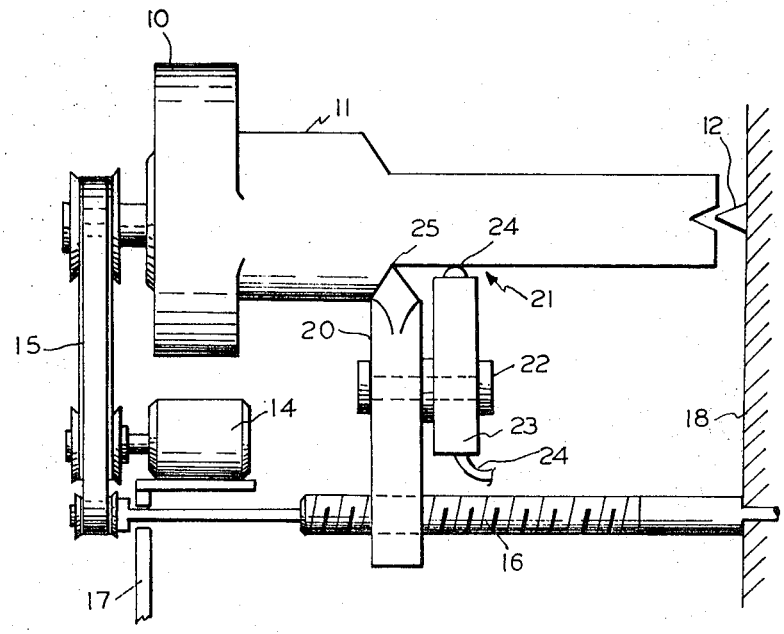

United States Patent

[11] 3,577,642

| [72] | Inventors | Joseph V. Tripoli<br>329 Troy-Del Way, Williamsville,<br>John J. Caligiuri, West Seneca, N.Y. |
|------|-----------|---|
| [21] | Appl. No. | 704,726 |
| [22] | Filed | Feb. 12, 1968 |
| [45] | Patented | May 4, 1971 |
| [73] | Assignee | Said Caligiuri assignor to said Tripoli. |

[54] IN-PROCESS WORKPIECE GAGING APPARATUS
6 Claims, 5 Drawing Figs.

[52] U.S. Cl. .................................................. 33/172,
73/37.5
[51] Int. Cl. ..................................................... G01b 13/00
[50] Field of Search ........................................... 33/172 (A),
(Air Digest), (Inquired); 73/37.5

[56] References Cited
UNITED STATES PATENTS

| 2,691,827 | 10/1954 | Aller ............................ | 33/172(A) |
| 3,084,445 | 4/1963 | Klimaytis ................... | 33/174(L) |

*Primary Examiner*—Samuel S. Matthews
*Attorney*—Laurence R. Brown

ABSTRACT: There is disclosed a system for gauging the dimensions of a machines surface of a workpiece being machined by a lathe or similar device, while it is being machined. Tp accomplish this, a machine tool having the cutting edge has affixed thereto a feeler gauge in such position as to encounter the workpiece in a region where it has just been machines. This gauge then moves with the cutting tool over the newly worked surface to give an indication of any variations from tolerance while the work is in process. A pneumatic gauge system is disclosed with particular feeler gauge structure to permit it to be used with various size parts.

PATENTED MAY 4 1971 3,577,642

SHEET 1 OF 3

INVENTORS
JOSEPH V. TRIPOLI
JOHN J. CALIGIURI

BY Lawrence R. Brown

ATTORNEY

INVENTORS
JOSEPH V. TRIPOLI
JOHN J. CALIGIURI

BY Laurence R. Brown

ATTORNEY

IN-PROCESS WORKPIECE GAGING APPARATUS

This invention relates to control of machine tools, including lathes and other devices for drilling, cutting and shaping workpieces, and more particularly, it relates to apparatus for gauging the dimensions of workpieces being produced in such machines.

While this specification uses the term machine tools to define generally the class of machines for drilling, cutting or shaping workpieces, typical operating conditions to be encountered may be exemplified by reference to a lathe. In a lathe, a workpiece may be cut into cylindrical form by some sort of machine tool having a cutting edge which is held against the workpiece and moved relative to it. In many cases such machines are automated to move the cutting tool through a predesignated program which in simplest form may constitute a linear motion along the axial direction of the workpiece at a constant distance away to produce a cylindrical configuration.

In such operations which are automatically programmed, it is conventional to take samples of the workpiece from time to time and gauge them to determine if there is a variation in tolerances sufficient to require a readjustment or a rejection of the workpieces. Tool and machine wear or catastrophic failure can cause failures resulting in production of many defective workpieces. They may be expensive or may require expensive manual gauging and selection from a large batch when critical dimensions or quality control is involved. Thus, it is desirable to provide some efficient gauging means that monitors each workpiece in process and controls the machine tool to stop work as soon as any defect arises, so that the source of the defect may be corrected.

It is therefore an object of this invention to provide improved gauging apparatus.

Another object of the invention is to provide gauging apparatus for monitoring the workpiece as it is being machined.

A further object of the invention is to provide an automatic control system responsive to gauging apparatus to monitor work in progress and to effectuate appropriate control when acceptable tolerances are exceeded.

Thus, in accordance with this invention, a workpiece is cut and gauged at the same time by the expedient of coupling together in fixed relative position the cutting tool and a feeler gauge. They are so positioned that the feeler gauge rides against the workpiece surface just cut at a position adjacent the cutting edge to thereby ride along with the cutting tool along its entire program and sense any variations from tolerance while the workpiece is being processed or machined.

Sensing switches or indicators are made responsive to variations of dimension in the feeler gauge so that the milling machinery may be instructed to take appropriate corrective or shutdown action. The feeler gauges are preferably pneumatic in nature and connected with an air supply in such a system that wide ranges of tolerances and workpiece conditions may be accommodated. Such a system includes appropriate regulators, bleeders and valves and restrictions both fixed and adjustable and provide for a convenient and accurate gauging without damage to the workpiece.

Figure 2:
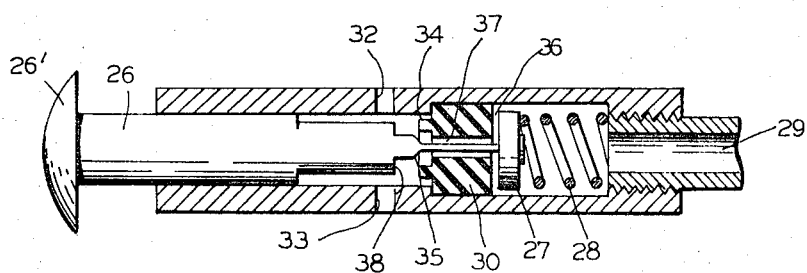
Figure 3:
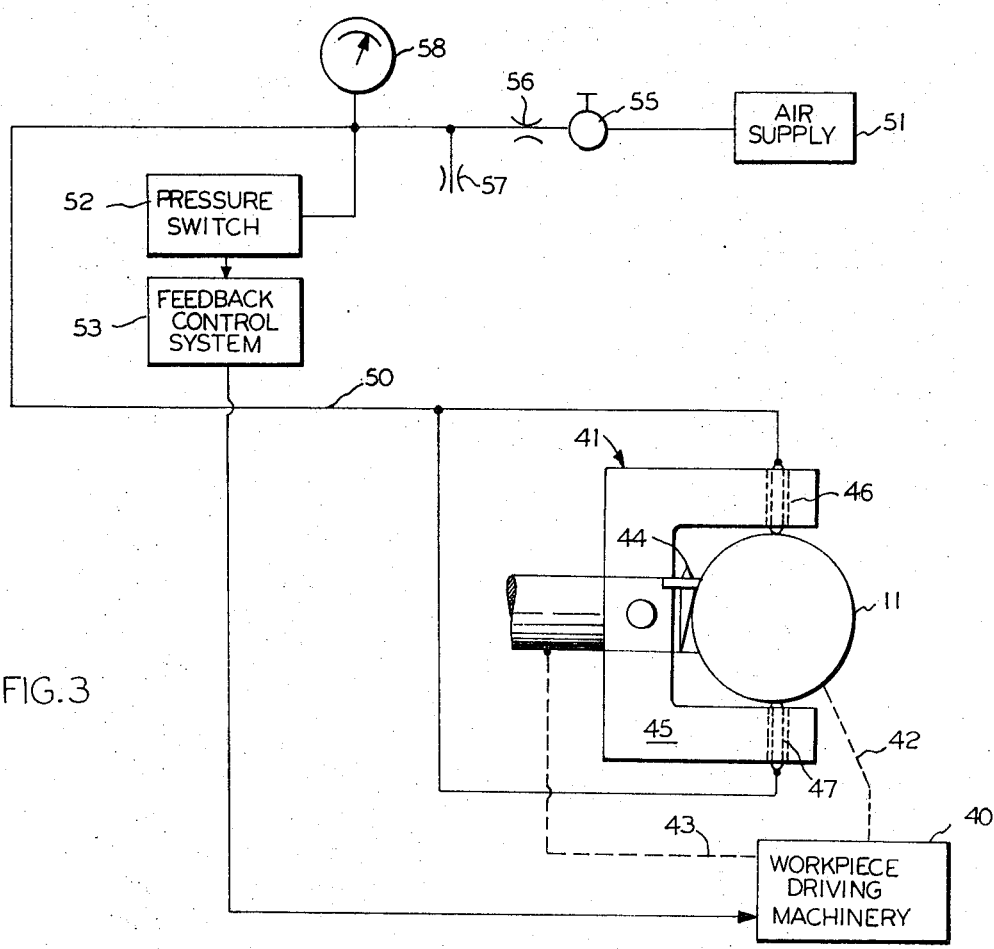
Figure 4:
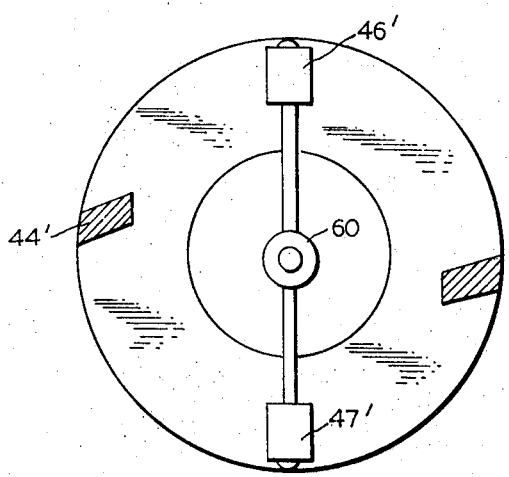
Figure 5:
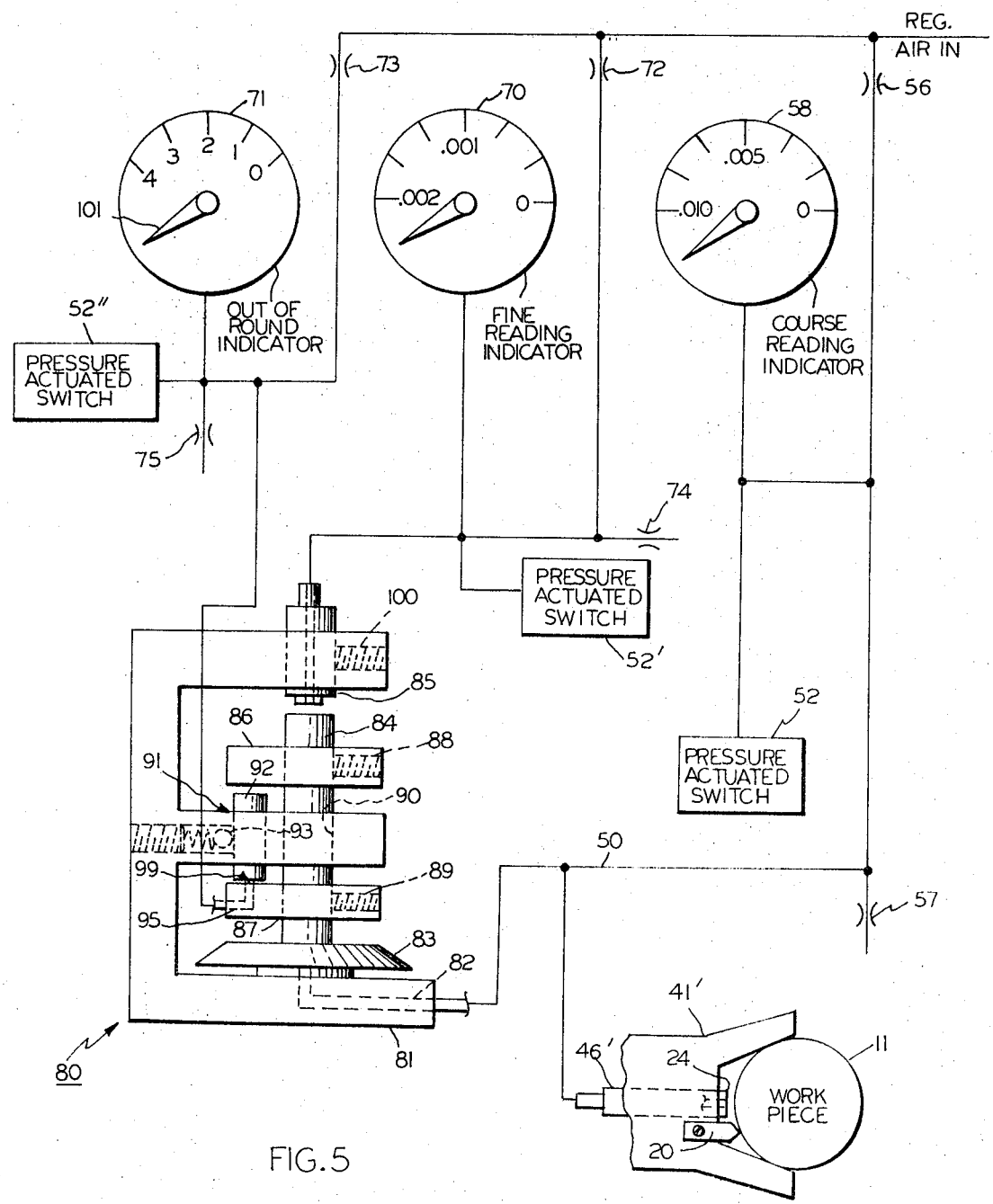

Other objects and features are found throughout the remaining specification which makes reference to the accompanying drawings, in which:

FIG. 1 is a simplified sketch of a machine tool system constructed in accordance with this invention, FIG. 2 is a plan view, partially in section, of a pneumatic feeler gauge assembly constructed in accordance with this invention, FIG. 3 is a schematic diagram of a pneumatic gauging and control system constructed in accordance with the invention, FIG. 4 is a cross section view of an internal boring tool constructed in accordance with teachings of this invention, and FIG. 5 is a schematic view of a further pneumatic gauging and control system afforded by the invention.

Referring now to FIGS. 1 and 2 of the drawings, a typical machining operation is exemplified by means of a lathe having a chuck 10 grasping and holding workpiece 11 in place against spindle 12 for rotation by means of motor 14 and belt 15. The motor also drives the advancing screw 16 journaled in frame members 17, 18 to advance the cutting tool 20 toward the left along workpiece 11, leaving a freshly machined surface 21.

Fixed in position alongside cutting tool 20, by means of bolt 22 or any other fastening means, is a feeler gauge 23, which may be connected to pneumatic air line 24. One form of such a feeler gauge is shown in FIG. 2 and others may be used to provide a feeler 23 contacting the freshly milled surface 21 near the cutter point 25 so that the workpiece is continually gauged as the workpiece is actually and continuously being cut. Thus, if a tool becomes broken or sufficiently worn, a substantially immediate indication is given by feeler gauge 23.

As shown in FIG. 2, the feeler gauge may comprise a linear plunger shaft 26 with feeler head 26' for contacting a workpiece causing the shaft 26 to ride back and forth as the contact surface dimensions change. An air inlet line at 29 passes a controlled flow of air past retainer 27 through passage 36 into aperture 37 in sleeve 30, past the throat within collar 34 and out bleeder orifices 32, 33. The sleeve 30 frictionally rides within the cylinder to attain a semistable position until pushed to a new position. Depending upon the size of the workpiece engaging feeler head 26', shaft 26 will move toward the right pushing retainer 27 against spring 28 and disengaging the retainer 27 from the sleeve 30, which in rest position, closes the air passage to an extent establishing a known airflow of such a nature that gauges coupled with the air line will indicate a preestablished reading. The airpath is opened in actual reading such a way that the retainer 27 is not in contact with the sleeve 30 and thus slight variations in the position of feeler head 26' will vary the position tapered plunger gauge surface 35 in the throat of sleeve 30 to give a wide range in the amount of airflow through aperture 37, in either a linear manner or using any other preferred function of the spacing, taper and dimensions of the throat and tapered gauge surface 35.

If the workpiece surface dimension displaces feeler head 26' far enough, then the shoulder 38 engages collar 34 of sliding sleeve 30 and pushes the sleeve to a new position where the variations of workpiece surface are then gauged in accordance with the position of tapered surface 35 as before explained. It is readily seen that this novel construction permits sensitive gauging of small tolerance variations over large range of workpiece size. Any out-of-roundness in the workpiece will cause variations in the pressure of air which are readily sensed by a pneumatic metering system and displayed or signaled for operator notification. Other variations such as runout will also be indicated. After use, the gauge shaft 26 under force of spring 28 is returned to inactive position with sleeve retainer 27 closing the airflow apertures 36 and 37 to prevent passage of air.

Airflow may be supplied by any suitable supply at pressures and conditions easily determined by experimentation to best suit the air pressures, dimensions and requirements of conventional air-sensitive gauges or switches used. These sorts of pneumatic controls and devices are well known in the art and need not be described in detail, but may be chosen to suit the tolerances and conditions encountered in any particular workshop or workpiece.

A control system is shown schematically in FIG. 3, with the workpiece driving machinery 40 relatively positioning workpiece 11 and the tool-gauge unit 41, as indicated by dash lines 42, 43. In this instance the cutting tool 44 has affixed to it a C-shaped bracket 45 encompassing the workpiece, and having respective feeler gauges 46, 47 in each open arm of the bracket 45. These gauges 46, 47 are adapted to ride on opposed machined surfaces of the workpiece 11, and as shown in typical manner are diametrically opposed on the surface of the workpiece cylinder.

Each of these gauges 46, 47, which may comprise simply an air jet which releases more air as the distance to the workpiece is increased, is coupled into a single air line 50 supplied with airflow from pneumatic source 51. Many types of gauge heads might be employed in the system, if desired, and a single feeler gauge of the type before described could also be used in a lathe in the manner displayed in FIG. 1 or on grinding and milling machines, and the like. While more complex or more simple systems may be used, this system disclosed gives a broad range of controls and is operable to override and control automatically the workpiece driving machinery 40 in the event of an out-of-tolerance production port or workpiece 11. In the simplest possible form a pneumatic pressure switch 52 senses the alarm level in air line 50 to operate the switch. Thus, by means of the feedback control system 53, which may be a shutdown or stop control on machinery 40, any defect controls operation of the milling machine while work is in process responsive to the indication of airflow through the feeler gauge assembly 45.

To give adequate range and adjustment to the pneumatic system, an air pressure regulator 55 is used in conjunction with a restrictor or valve 56 and appropriate bleed orifice or valve 57. A visual analog indication may be sensed on a conventional air gauge 58.

Other tool combinations may be used as exemplified by the section view of the internal boring or boring tool of FIG. 4. Thus, cutters 44' or equivalent bores cut or ream out a hole which is monitored as it is being cut by the feeler gauges 46' and 47' affixed to the tool assembly in a manner similar to those described hereinbefore. However, a rotary union 60 is used in this arrangement to couple the air line to the gauges.

A more versatile system arrangement is shown in FIG. 5, where the same reference characters are used to identify similar features hereinbefore described. This system includes in addition to coarse-reading gauge 58, a fine-reading gauge 70 and an out-of-round gauge 71. These respectively have restriction valves 56, 72, 73 and bleeder valves 57, 74, 75 which permit calibration. These valves may be fixed or adjustable depending upon system requirements for changing ranges or sensitivities.

This system is particularly useful with grinders where tolerances of tenths of thousandths of an inch are required, since the coarse-reading gauges may only be accurate to tolerances of about one-thousandth of an inch. When used with lathes and the coarser tolerances, the fine-reading gauge may not be necessary.

Changes of airflow at the workpiece are amplified by such means as generally indicated at 80 to provide more sensitive readings at meters 70 and 71 and to relay corresponding control signals by means of switches 52' and 52".

Changes of airflow at the workpiece are amplified by such means as generally indicated at 80 to provide more sensitive readings at meters 70 and 71 and to relay corresponding control signals by means of switches 52' and 52".

This amplifier 80 comprises a frame member 81, which includes a channel 82 for conveying airflow changes to diaphragm 83. This diaphragm 83 moves sliding relay post 84 up and down in a guide aperture 90 in the center frame leg to modify the flow path of air from the air jet 85 in the top leg of the E-shaped frame member which air jet serves to operate fine-reading indicator dial 70. The relay post 84 has two adjustable stops 86, 87 which are affixed by setscrews 88, 89 to the post 84.

In a further aperture 91 in the center leg is held frictionally a further relay rod 92 by means of the spring-biased ball 93, so that it will be adjusted to a new frictionally held position by means of stop arms 86 and 87 on the main relay post 84. This serves by means of air channel 95 to modify the airflow and provide a corresponding indication on the out-of-round indicator meter dial 71 in substantially the same manner as before discussed in connection with the feeler gauge of FIG. 2 to be insensitive to changes of workpiece size. Whenever a workpiece is removed, the diaphragm 83 bottoms and arm 88 resets relay rod 92 close to the air jet 99 on the lower stop 89.

The feeler gauge 24 is basically in this embodiment an air jet which produces a back pressure in the line 50 dependent upon the size of the workpiece 11 intruding in the jaws of the V-clamp 41'.

In operation any decrease of size of the workpiece 11 will increase back pressure in line 50 giving a coarse indication on meter 58, and expanding diaphragm 83. When the size of the work part reaches within a desired tolerance, such as 0.001 inch, at which jet 85 is set by setscrew 100, the airflow is modified enough to cause a reading on the fine-reading dial 70. Thus, a vernier reading is supplied at the critical regions of workpiece 11 to permit an alarm to be sounded, or pressure switch 52' to stop the machine or make an automatic speed or tool adjustment, etc.

Furthermore, any out-of-round will show up on dial 71 as the diaphragm pushes up rod 92 to close the airflow at jet 99 and cause a zero reading on dial 71. This continues as long as the size is reduced evenly, but any out-of-round will lower diaphragm 83 and let air escape from jet 99 because rod 92 is frictionally held in place by ball 93. The amount of out-of-roundness then is indicated by the fluctuation of needle 101 on meter dial 71. When any new workpiece is inserted, the relay rod 92 is pushed down to the new machining position.

It is evident that this invention provides novel features in combination which result in improved operation in gauging workpieces as they are being machined.

Having therefore described in detail specific embodiments, the invention is defined with particularity in the appended claims which are representative of its spirit and nature.

We claim:

1. Apparatus for gauging pneumatically the dimensions of a workpiece being machined comprising in combination, a structure holding a first member for movement relative thereto to attain a position adjacent a workpiece representing a dimension of said workpiece and a second member for movement relative thereto along with said first member to a position where it is frictionally held to identify at least one workpiece dimension, pneumatic convergence means passing an airpath between said members such as to modify the flow of air as the members change relative positions in response to workpiece dimensional variations and coupling means for presenting the airflow path to a sensor for indicating variations of workpiece size as a function of the modifications of flow of air by relative movement of the two said members and the workpiece.

2. A system for displaying indications of the dimensions of a workpiece in the process of being machined, comprising in combination, means for sensing at least one dimension of a workpiece being machined, first pneumatic indicating means coupled with said sensing means for indicating a first order of readings of said dimension, pneumatic amplifying means coupled with said sensing means to provide pneumatic amplifying means coupled with said sensing means to provide pneumatic signals representing variations of workpiece dimensions, second pneumatic indicating means responsive to said pneumatic signals for indicating fine readings of variations of said dimension of said workpiece, and means actuating said second pneumatic indicating means when the workpiece dimensions as indicated by said first pneumatic indicating means reach a predetermined dimension.

3. A system as defined in claim 2, including third pneumatic indicating means, and structure actuating said third means comprising a member movable to a semistable position determined by said means sensing a maximum dimension of the workpiece being machined, and airflow convergence means to said third pneumatic indicating means including restrictive means changing airflow dependent upon the position of said structure in the semistable position relative to changes in dimension of the workpiece from said maximum.

4. A system as defined in claim 3, wherein the pneumatic amplifying means comprises an E-shaped frame, a diaphragm operable from said means sensing the workpiece position, a relay post movable within the outer arms of the E-shaped frame by said diaphragm, and pneumatic conveyance channels in one of said outer arms defining an airflow path with flow modified by movement of said relay post, comprising said means actuating the second pneumatic indicating means.

5. A system as defined in claim 4, wherein a movable rod has means frictionally holding it in a semistable position in the middle arm of said frame, means moving the rod against the holding means responsive to movements of said relay post, and airflow path means disposed for modifying airflow as a function of relative displacements of said post and said rod.

6. Apparatus for indicating the dimensions of a workpiece being machined comprising a pneumatic system having a frame supporting a diaphragm actuable by changes of airflow, a relay member movable on said frame by the diaphragm within two limiting positions, first airflow path means passing air as a function of the relay member positioned within said two limits, a movable member frictionally held in a semistable position on said frame means moving the movable member frictionally to a semistable position on said frame defined by the position of the relay member, and second airflow path means passing air as a function of the difference in position between said relay and movable members.